(12) United States Patent
Jenny

(10) Patent No.: US 7,687,942 B2
(45) Date of Patent: Mar. 30, 2010

(54) IRON CORE LINEAR MOTOR HAVING LOW DETENT FORCE WITH HIGH POWER DENSITY

(76) Inventor: Alois Jenny, Wiesweg 1, 6037 Root (CH)

( * ) Notice: Subject to any disclaimer, the term of this patent is extended or adjusted under 35 U.S.C. 154(b) by 99 days.

(21) Appl. No.: 11/977,376

(22) Filed: Oct. 24, 2007

(65) Prior Publication Data

US 2008/0111430 A1 May 15, 2008

(30) Foreign Application Priority Data

Nov. 9, 2006 (CH) .................................. 1779/06

(51) Int. Cl.
*H02K 41/02* (2006.01)
*H02K 41/03* (2006.01)
*H02K 41/025* (2006.01)
*H02K 33/18* (2006.01)

(52) U.S. Cl. ................... 310/12.01; 310/13; 310/14; 310/15; 310/16; 310/39; 310/216.001

(58) Field of Classification Search ............ 310/12–39, 310/216; *H02K 33/18, 41/02, 41/03*
See application file for complete search history.

(56) References Cited

U.S. PATENT DOCUMENTS

| 4,912,746 | A | * | 3/1990 | Oishi | .................. 310/12.01 |
| 5,214,323 | A | | 5/1993 | Ueda et al. | |
| 5,780,948 | A | * | 7/1998 | Lee et al. | ................ 310/81 |

(Continued)

FOREIGN PATENT DOCUMENTS

EP  1 511 164 A2  3/2005

(Continued)

OTHER PUBLICATIONS

JP06070533_EN_AB.pdf : Takigawa (JP06070533, English abstract), Mar. 1994.*

(Continued)

*Primary Examiner*—Quyen Leung
*Assistant Examiner*—John K Kim
(74) *Attorney, Agent, or Firm*—Weingarten, Schurgin, Gagnebin & Lebovici LLP

(57) ABSTRACT

In a linear motor (1), the detent force is reduced by the height of the iron poles (522) being selected differently in the two outer regions of the coil set, preferably by a gradual reduction of the height of the iron poles (522) towards the ends of the stator (2). In combination with a slight inclination of the magnets, the detent forces are further minimized, with negligible losses of the propulsive force.

The exact dimensioning of the iron poles (522) is dependent inter alia on the dimensioning of the coils (51) and other characteristics of the linear motor (1) as a whole, and can be found and optimized by simulations. Here, an optimum is sought between as great a reduction as possible of the detent force amplitude and as high a propulsive force as possible. A linear motor (1) according to the invention has substantially the same manufacturing costs as a conventional linear motor without measures against the detent forces, because no costly active devices are necessary and the production of the stator does not become more complicated. As no additional space is necessary for active or passive devices for detent force reduction, such a linear motor is of more compact construction and therefore has a higher power density.

12 Claims, 4 Drawing Sheets

U.S. PATENT DOCUMENTS

| | | | |
|---|---|---|---|
| 6,476,524 B1 * | 11/2002 | Miyamoto et al. | 310/12.19 |
| 6,847,149 B2 * | 1/2005 | De Filippis | 310/216 |
| 7,026,731 B2 | 4/2006 | Beakley | |
| 2003/0098620 A1 * | 5/2003 | Ohto et al. | 310/12 |
| 2004/0256918 A1 | 12/2004 | Beakley | |
| 2005/0134122 A1 | 6/2005 | Uchida | |
| 2005/0236912 A1 | 10/2005 | Beakley et al. | |
| 2006/0012252 A1 * | 1/2006 | Miyata et al. | 310/12 |
| 2006/0279140 A1 | 12/2006 | Jenny | |

FOREIGN PATENT DOCUMENTS

| | | | |
|---|---|---|---|
| EP | 1 732 197 A2 | 12/2006 | |
| JP | 06038500 A * | 2/1994 | |
| JP | 06070533 A * | 3/1994 | |
| JP | 07053427 Y * | 12/1995 | |
| JP | 2001112119 A * | 4/2001 | |

OTHER PUBLICATIONS

JP06038500_EN.pdf: English translation of JP 6-38500, Naito et al. (1994).*

JP07053427_EN.pdf: English translation of JP 7-53427, Ohto et al. (1995).*

* cited by examiner

IRON CORE LINEAR MOTOR HAVING LOW DETENT FORCE WITH HIGH POWER DENSITY

This application claims priority to Swiss application No. 01779/06 filed Nov. 9, 2006.

TECHNICAL FIELD

The present invention relates to an iron core linear motor with a stator and a runner displaceably arranged along a running axis of the stator, in accordance with the introductory clause of the independent patent claim.

PRIOR ART

In modern automation technology, brushless linear motors are no longer unthinkable as actuators. They reach high speeds, and nevertheless reach a high precision into the nanometer range. For many applications of such linear motors, for example in linear axes or cross-tables, in addition as small a volume as possible of the linear motors is desired with, at the same time, as high an output as possible.

Linear motors are electric motors and consist of an immovable stator and a runner which is displaceable with respect to the stator along a running axis, said runner basically corresponding to the movable rotor in a rotating electric motor. The runner can be displaceably mounted with respect to the stator for example by a track/roller system. A construction which is specifically suitable for linear motors with compact dimensions, consisting of a monoblock and milled-in guide grooves, is disclosed in EP 1732197.

Linear motors can be produced in various types of construction, analogous to the rotating electric motors. In a variant which is especially suited for a high power density, several permanent magnets are arranged on the runner with an alternating pole alignment along the running axis, and several electromagnet coils are arranged on the stator, likewise along the running axis.

The coils are controlled so that a travelling magnetic field is produced, in which a force acts on the runner which moves the latter forward. The controlling of the coil takes place in modern, brushless linear motors electronically by means of field vector regulation and position measurement systems.

Alternatively in such a linear motor, the electromagnets can also be mounted on the runner, and the permanent magnets on the stator. This type of construction is more favourably priced in manufacture for track-shaped stators which are substantially longer than the runner. However, it requires a cable drag to the runner, whilst in the first variant the runner is freely movable.

In order to achieve higher propulsion outputs with, at the same time, a small motor volume, the electromagnets can be realized with iron core coils instead of with air core coils. In order to achieve outputs which are as high as possible, the air gap between iron poles and permanent magnets is, in addition, kept as small as possible. Furthermore, iron poles have the advantage that heat which occurs can be led off better, which likewise allows greater outputs.

However, the use of iron core coils has the considerable disadvantage, compared with air gaps, that a detent force occurs, the so-called "cogging", a phenomenon which is also known from rotating electric motors. Strong static, therefore current-independent attractive forces (detent forces), which require a robust design of the mechanical guidance of the runner, occur between the iron set, in particular the iron poles of the stator and the permanent magnets of the runner. With the movement of the runner with respect to the stator, a modulated, alternately positive and negative detent force results, which is superimposed on the constant propulsive force of the linear motor. When the linear motor travels at a constant speed, this modulated detent force must be continuously controlled, because otherwise an undulation of the speed pattern results. A further disadvantage of the detent force is the adulterated relationship between current consumption of the motor and effective propulsive force; this is not linear and therefore the motor can not be used for precise force- or force/path measurement.

In addition to the actual detent force in the iron core linear motor is also an inlet and outlet effect, due to the final length of the runner and/or of the stator. When the runner travels into the region of one of the two stator ends, the magnetic system is unsymmetrical and the detent force increases in addition. For a compact type of construction, however, as far as possible the maximum path of travel of the system should be able to be used. Therefore, this inlet/outlet effect is advantageously reduced.

A known solution for the reduction of the detent force in rotating electric motors and linear motors is the inclination of the permanent magnets with respect to the iron poles or respectively the inclination of the iron poles with respect to the permanent magnets or alternatively the use of specially shaped permanent magnets.

This leads to the superimposing of attracting and repelling forces, and therefore to a reduction of the detent force. As an intensive degree of inclination (up to 20°) is necessary, the resulting propulsive force, however, automatically also falls thereby.

A similar solution is also shown by U.S. Pat. No. 5,214,323, in which a partial neutralizing of the detent force is achieved by the combination of two stators and two runners which are coupled with each other, in which the stators or the runners are offset with respect to each other by half a pole clearance. However, it is difficult to achieve a compact type of construction of the linear motor with this development.

US 2004/0256918 A1 shows a linear motor with a runner with electromagnets and with a track-shaped stator with permanent magnets, in which an additional coil, mounted at the end of the runner, is controlled so that it produces a counteracting force in opposition with respect to the detent force, and thus neutralizes the detent force. This solution is only suitable for runners which move on a long stator. The additional active element is, in addition, complex and therefore expensive.

US 2005/0236912 A1 and U.S. Pat. No. 4,912,746 use specially shaped blind pole blocks, i.e. iron poles without coils, at the two ends of the coil set. The reduction of the propulsive force is less, but the coil set becomes longer and heavier. The static attracting force between stator and runner additionally becomes greater, which makes a more robust design of the mechanical guidance necessary.

EP 1511164 A2 shows a linear motor with a runner equipped with electromagnets, in which a blind iron pole is arranged at the two ends of the runner. The said iron pole in the end position is intended to reduce the detent force, and has a curved surface, and also has bores over the entire width of the blind iron pole, in which magnets are arranged. Such a type of construction is complex and, accordingly, expensive.

US 2005/0134122 A1 shows a linear motor in which, in accordance with the nonius principle, the distance between the individual iron poles is slightly less than the distance between the permanent magnets. This leads to destructive interference of the detent forces, and hence to a reduction of the detent forces. However, the detent force problem is not solved thereby in the inlet/outlet region.

The use of T-shaped, ribbed iron poles is likewise known from the prior art in order to achieve a more homogeneous static attraction force between permanent magnets and iron poles. This type of construction has the disadvantage that the coils can not be simply be turned over the iron poles, but rather must be wound around them in a complicated manner. The overall height is likewise higher.

DESCRIPTION OF THE INVENTION

It is an object of the present invention to provide an iron core linear motor of the type initially mentioned, in which the above-mentioned problems are largely avoided, and which has in particular a low detent force even in the inlet/outlet region, allows a compact type of construction and can be produced at a favourable cost.

This and other problems are solved by a linear motor of the type initially mentioned in accordance with the independent Claim 1. Further advantageous embodiments of a linear motor according to the invention will be apparent from the dependent claims.

In an iron core linear motor according to the invention, the intrusive detent force and the in/outlet effect are reduced on the one hand by the height of the iron poles being selected differently in the two outer regions of the coil set, preferably by a gradual reduction of the height of the iron poles towards the ends of the stator, and on the other hand by a slight inclination (by a few degrees) of the permanent magnets, respectively iron poles. The coils themselves are preferably identical. The exact dimensioning of the iron poles is dependent, inter alia, on the dimensioning of the coils and other characteristics of the entire linear motor, and can be found and optimized by three-dimensional, finite element method (FEM) simulations. Here, an optimum is sought between as great a reduction of the detent force amplitude as possible and as small a reduction as possible of the motor power.

The different height of the iron poles in combination with the slight inclination of the magnets leads to the repelling and attracting static forces between the individual permanent magnets and the iron poles for the most part reciprocally overlying each other so that in the translatory direction the effectively resulting detent force only shows a low amplitude compared with a linear motor with identical pole heights.

An iron core linear motor according to the invention has substantially the same manufacturing costs as a conventional iron core linear motor without measures against the detent force, because no costly active devices are necessary and the manufacture of the stator does not become more complicated.

EXECUTION OF THE INVENTION

The mode of operation of a linear motor according to the invention is to be further explained below with reference to the attached drawings.

Figure 1:
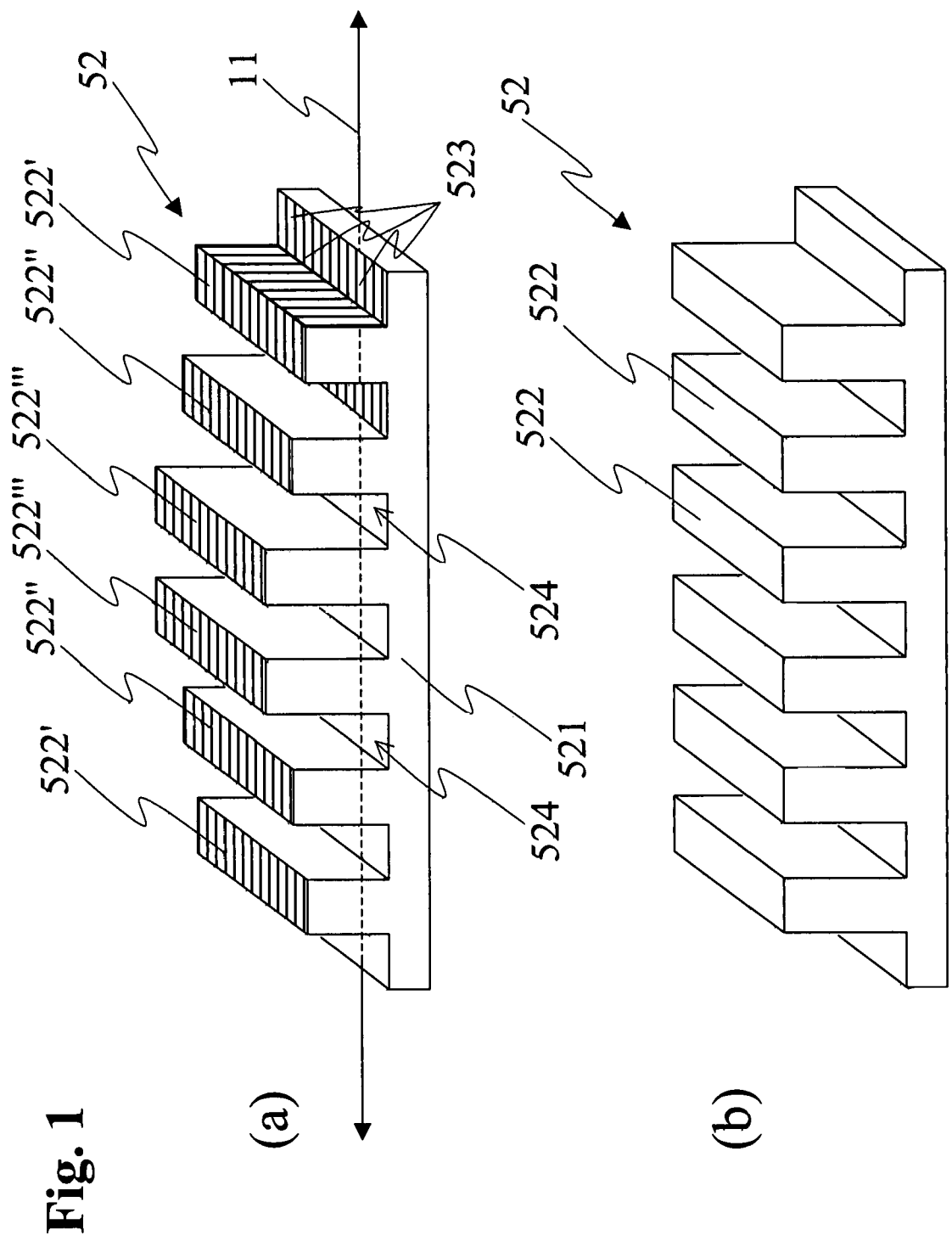
FIG. 1 shows diagrammatically a possible embodiment of an iron set of a linear motor (a) according to the invention and of the iron set of a conventional linear motor (b).

A possible form of construction of the iron set 52 of a stator of a linear motor according to the invention is illustrated diagrammatically in FIG. 1(a). The corresponding linear motor has a stator with six coils (not illustrated), which are turned over the six iron poles 522 of the iron set 52. The individual iron poles 522 are connected by means of an iron core 521 on the rear side. To avoid eddy currents, the iron set 52, as is usual in electric motors, consists of a plurality of laminated iron plates 523 (only partially illustrated). The height of the individual iron poles (522', 522'', 522''' decreases along the running axis 11 towards the two ends of the iron set 52. Here, two iron poles are respectively of equal height. By comparison, FIG. 1(b) shows an iron set of a linear motor with the iron pole height remaining identical, as is known from the prior art.

Figure 2:
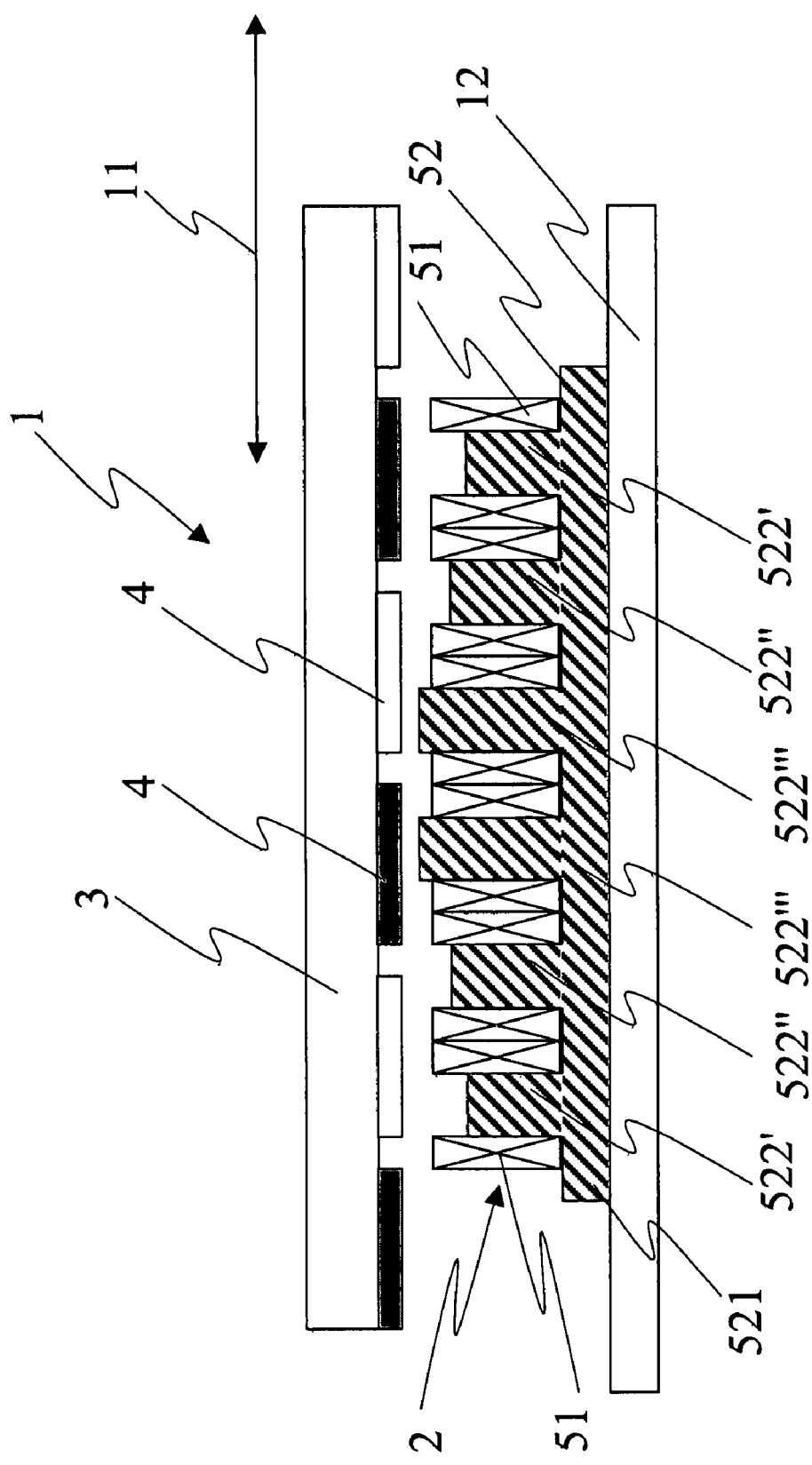
FIG. 2 shows a linear motor according to the invention in a longitudinal section along the running axis.

FIG. 2 shows diagrammatically a linear motor 1 according to the invention, with the iron set 52 of FIG. 1(a), in a longitudinal section along the running axis. The stator 2 comprises an iron set 52, mounted on a base plate 12, with six iron poles 522', 522'', 522'''. Six identical coils 52 are arranged around the six iron poles. The runner 3 is arranged over the stator 2, said runner 3 being mounted so as to be freely movable along the running axis 11. A plurality of permanent magnets 4, arranged obliquely by a few degrees, with alternating polarity, is arranged on the side of the runner 3 facing the stator 2. The height of the individual iron poles 522', 522'', 522''' decreases towards the ends of the iron set 52 on the longitudinal side, with the height of the coils 51 remaining identical. The linear motor which is shown is a 3-phase motor; the distance of the individual permanent magnets in the running direction corresponds to 1.5 times the distance of the iron poles.

EXAMPLE EMBODIMENT

The ideal height of the individual iron poles 522 for given overall dimensions of a linear motor can be determined by corresponding FEM simulations, in which the heights of the iron poles are varied until the amplitude of the detent force modulation is minimal. An iron set with a depth of 20 mm, a length in the running direction of 52 mm, a height of the iron core of 3.2 mm and a maximum height of 10.5 mm has six iron poles. All the iron poles have a length of 4 mm in the running direction and are separated by 4 mm-wide grooves. The height of the six coils which are turned over the iron poles is respectively 7.1 mm. The optimized heights of the individual iron poles were calculated by 3D FEM simulation for a stator which is dimensioned in such a way, in which the amplitude of the transversal component of the detent force is minimal in the running direction, with the two innermost iron poles with a fixed height over the iron core of 7.3 mm not having been varied. An optimum was found for a height of 6.70 for the two second-outermost iron poles and a height of 5.90 mm for the two outermost iron poles. The slight inclination of the permanent magnets with respect to the vertical to the running axis is between 5 and 8 degrees, preferably between 6 and 7 degrees, and particularly preferably 6.8 degrees.

Figure 3:
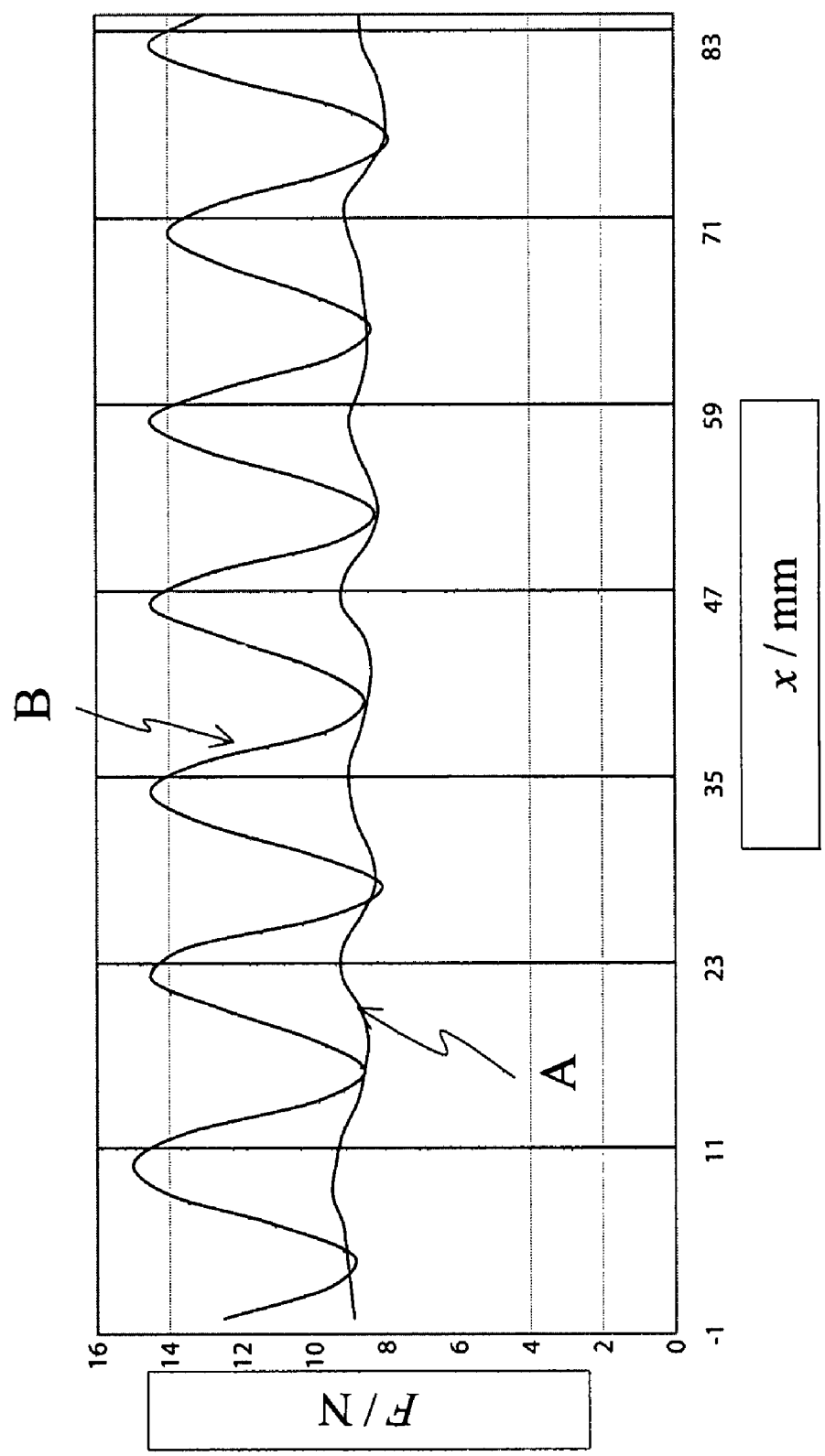
FIG. 3 shows the force/path diagram of a linear motor according to the invention compared with a conventional linear motor with identical pole heights.

FIG. 3 shows the effective propulsive force F in a 3-phase linear motor acting on a movable runner along the running axis on travel over the stator of a linear motor, as a function of the position x of the runner in relation to the stator. The force F is composed of the motor power of the linear motor, which is operated with a constant current, and the static detent force between the permanent magnets of the runner and the iron poles of the stator.

Curve A shows a measurement with an iron set according to the example embodiment, whilst Curve B shows a measurement with an iron set with identical iron poles.

The amplitude of the modulated detent force of the linear motor according to the invention is approximately 1 N, whereas it is approximately 6 N without a pole height correction.

The amplitude of the detent force can be still further reduced by a more intensive inclination of the permanent magnets. Here, however, the propulsive force is also reduced. The design can be optimized to the desired characteristics by means of 3D FEM simulation.

Figure 4:
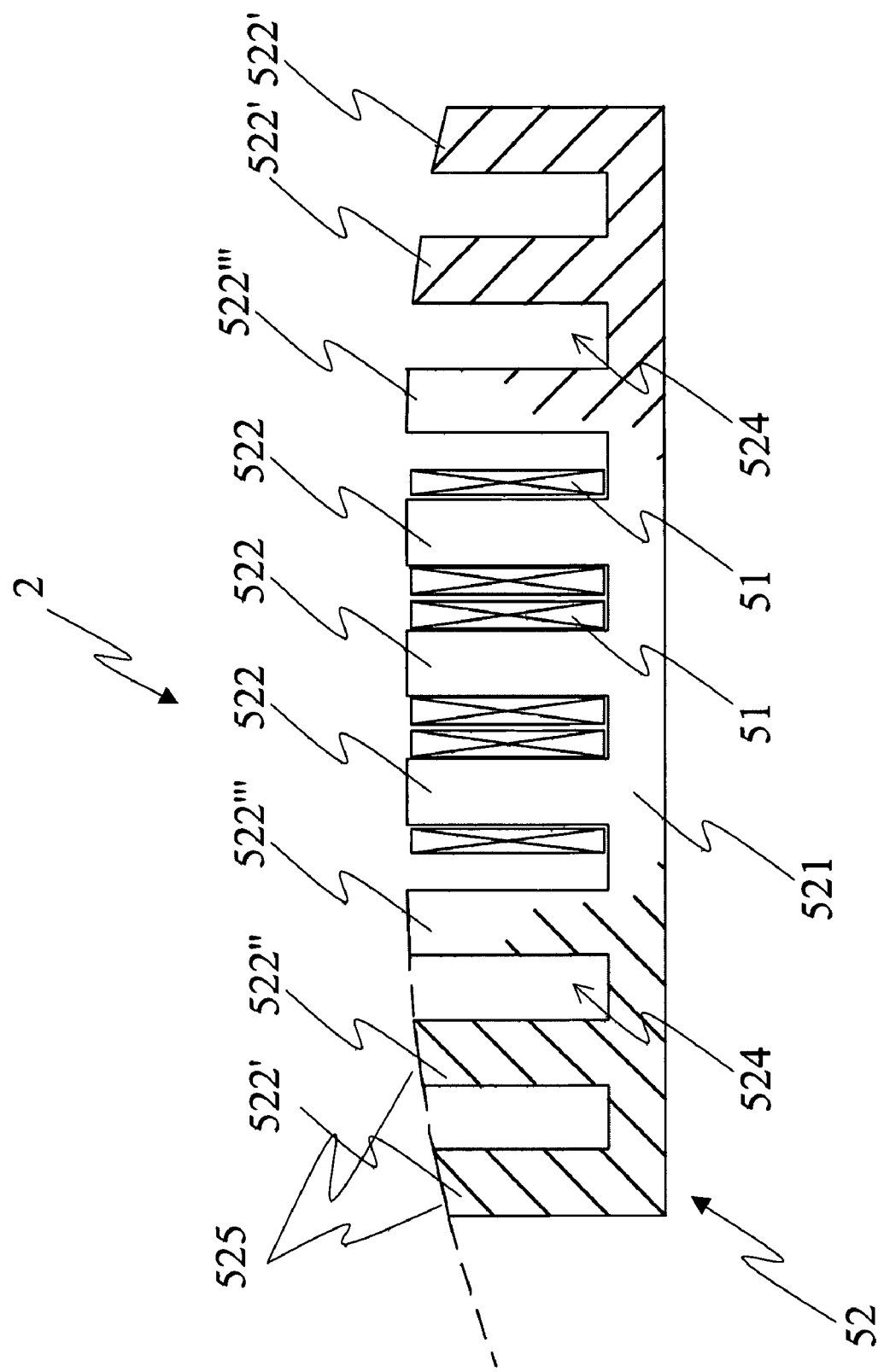
FIG. 4 shows diagrammatically a further possible embodiment of a stator of a linear motor according to the invention.

FIG. 4 shows in a longitudinal section along the running axis a further preferred embodiment of a stator 2 of a linear motor according to the invention, with an iron set 52 with nine iron poles 522, 522', 522'', 522'''. The shape of the iron set is again in mirror symmetry. For reasons of clarity, the coils 51 are only illustrated with respect to the three inner iron poles 522, but all the iron poles have identical coils 51.

The variant shown of a stator 2 for a linear motor according to the invention is longer than the stator of FIG. 2. The heights of the three inner iron poles 522 are therefore selected identically, because the inlet and outlet effect plays a negligible part in this region. The pole height of the three outermost iron poles 522', 522", 522''' again decreases towards the two ends of the iron set 52. In order to further reduce the detent force, the end faces 525 of the iron poles, directed towards the runner, are convex in shape, with a decreasing height towards the ends of the stator. In a particularly preferred form, the end faces 525 of the three reduced outer iron poles correspond in longitudinal section to a segment of a circle. In a further possible embodiment, the end faces 525 of the three reduced outer iron poles correspond in longitudinal section to an obliquely decreasing triangle side.

The first-mentioned example embodiment for optimized dimensions of a linear motor according to the invention can be adapted to any given or desired geometry of a linear motor by a specialist in the art, without greater effort, by the application of known simulation methods, particularly FEM. In particular, it is also possible to also generalize the principle of the invention to other types of iron core linear motors.

LIST OF REFERENCE NUMBERS 1 linear motor
11 running axis
12 base plate
2 stator
3 runner
4 permanent magnet
51 coil
52 armature/iron set
521 iron core
522,522',522",522''' iron pole
523 iron plate
524 groove
525 end faces of the iron poles

The invention claimed is:

1. An iron core linear motor with a stator and a runner which is displaceably arranged along a running axis of the stator, the stator having two ends, said linear motor comprising:
a plurality of permanent magnets being arranged with alternating pole alignment along said running axis on at least one of the stator and the runner,
wherein at least one of the runner and the stator comprises an iron set with a plurality of iron poles with coils of identical height mounted on said iron set,
wherein end faces of said iron poles are decreasing obliquely towards the two ends of said stator, and
wherein the height of said iron poles is unequal to reduce detent forces.

2. The linear motor according to claim 1, wherein the height of said iron poles of the individual coils decreases in the running direction towards the two ends of said iron set.

3. The linear motor according to claim 1, wherein the end faces of said iron poles run parallel to the plane of said permanent magnets of said runner.

4. The linear motor according to claim 1, wherein the height of said iron poles is identical in a plurality of adjacent iron poles.

5. The linear motor according to claim 1, wherein the height of an iron pole is respectively between 8% and 12% less than the height of the adjacent iron pole situated towards the center of said iron set.

6. The linear motor according to claim 1, wherein said linear motor is a 3-phase linear motor.

7. An iron core linear motor with a stator and a runner which is displaceably arranged along a running axis of the stator, the stator having two ends, said linear motor comprising:
a plurality of permanent magnets being arranged with alternating pole alignment along said running axis on at least one of the stator and the runner,
wherein at least one of the runner and the stator comprises an iron set with a plurality of iron poles with coils of identical height mounted on said iron set,
wherein end faces of said iron poles are rounded, with the end faces in a longitudinal section along the running axis preferably corresponding to various segments of an identical circle, and
wherein the height of said iron poles is unequal to reduce detent forces.

8. The linear motor according to claim 7, wherein the height of said iron poles is identical in two or more adjacent iron poles.

9. The linear motor according to claim 7, wherein the height of an iron pole is respectively between 8% and 12% less than the height of the adjacent iron pole situated towards the center of said iron set.

10. An iron core linear motor with a stator and a runner which is displaceably arranged along a running axis of the stator, said linear motor comprising:
a plurality of permanent magnets being arranged with alternating pole alignment along said running axis on at least one of the stator and the runner,
wherein at least one of the runner and the stator comprises an iron set having two ends and a plurality of iron poles with coils of identical height mounted on said iron set, and
wherein the height of said iron poles is unequal to reduce detent forces and said height of said iron poles of the individual coils decreases in the running direction towards the two ends of said iron set;
the end faces of said iron poles are decreasing obliquely towards the two ends of said stator; and
the end faces of said iron poles are rounded, with the end faces in a longitudinal section along the running axis preferably corresponding to various segments of an identical circle.

11. The linear motor according to claim 10, wherein the end faces of said iron poles are decreasing obliquely towards the two ends of said stator.

12. An iron core linear motor with a stator and a runner which is displaceably arranged along a running axis of the stator, said linear motor comprising:
a plurality of permanent magnets being arranged with alternating pole alignment along said running axis on at least one of the stator and the runner,
wherein at least one of the runner and the stator comprises an iron set having two ends and a plurality of iron poles with coils of identical height mounted on said iron set, and
wherein the height of said iron poles is unequal to reduce detent forces and said height of said iron poles of the individual coils decreases in the running direction towards the two ends of said iron set;
end faces of said iron poles run parallel to the plane of said permanent magnets of said runner.

* * * * *